Patented Nov. 10, 1931

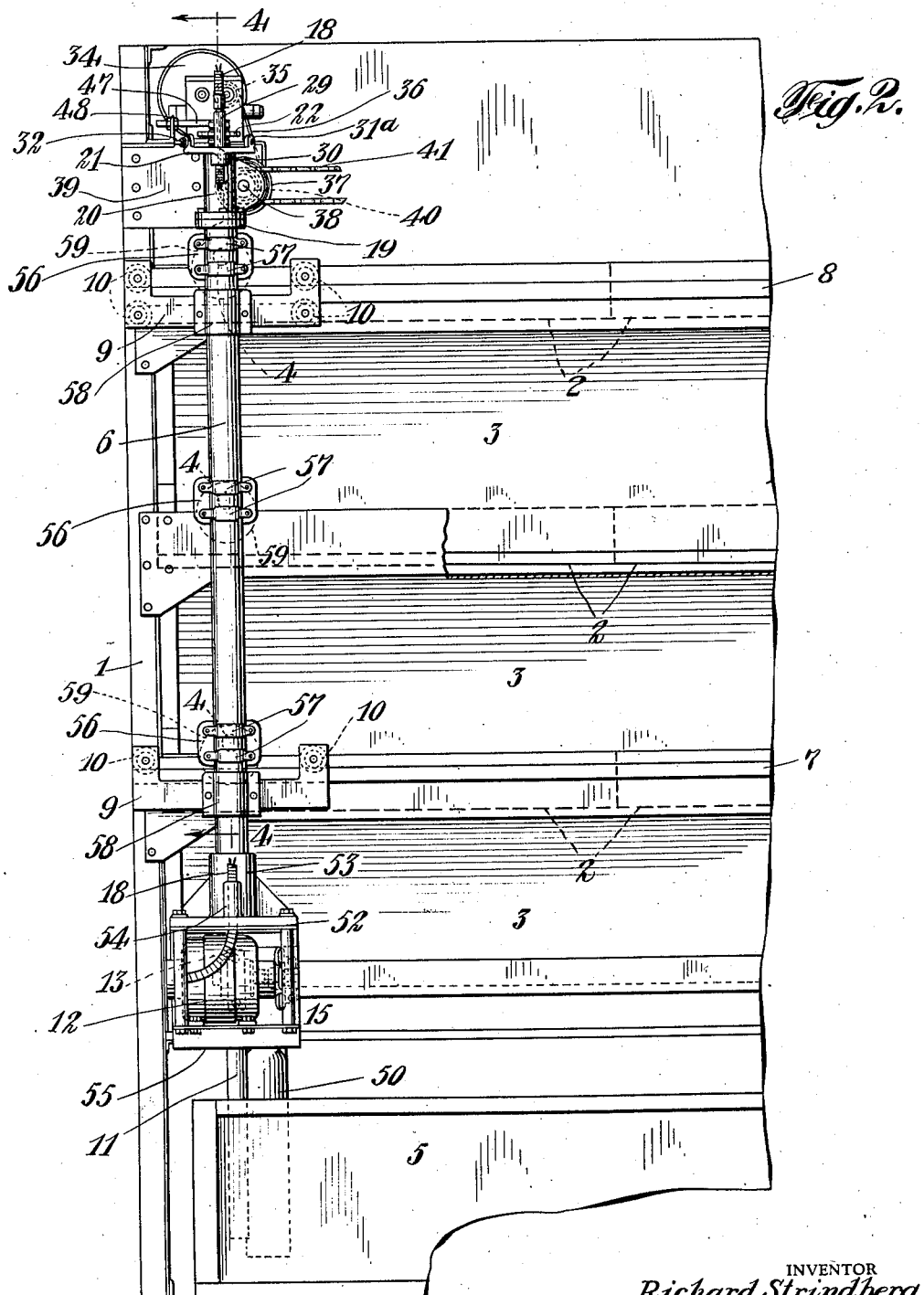

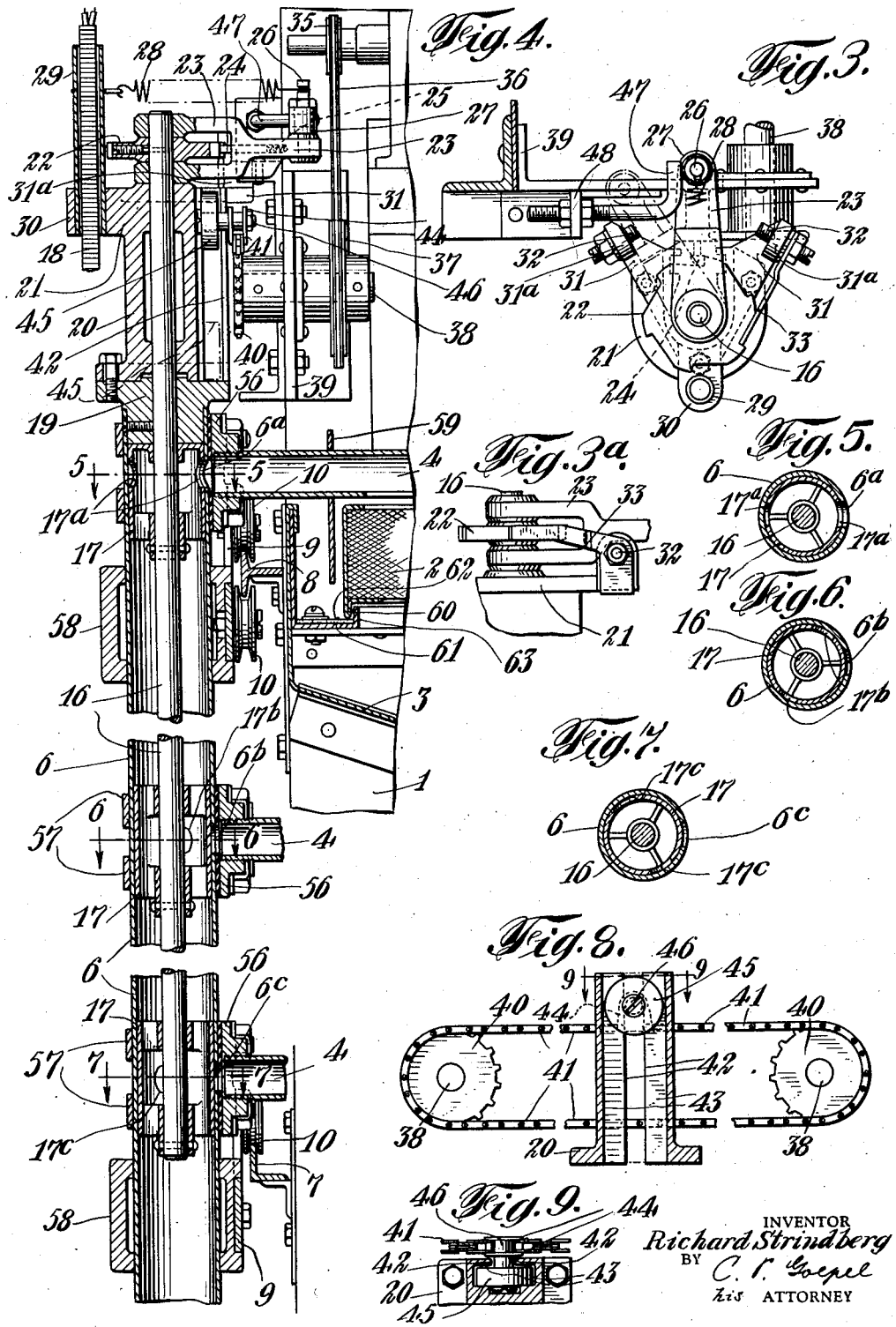

1,831,782

UNITED STATES PATENT OFFICE

RICHARD STRINDBERG, OF BRADFORD, PENNSYLVANIA, ASSIGNOR, BY MESNE ASSIGNMENTS, TO AMERICAN AIR FILTER COMPANY, INC., OF LOUISVILLE, KENTUCKY, A CORPORATION OF DELAWARE

AUTOMATIC SPRAY HEADER FOR HORIZONTAL SELF-CLEANING FILTERS

Application filed December 12, 1927. Serial No. 239,358.

My invention relates to filters, particularly air filters, designed to be cleaned of the dust and other substances which are extracted from the air passing through the filter.

An object of my invention is to provide an improved filter comprising a number of units or cells suitably mounted in position to cause air to pass through them, and the dust and the like suspended in the air to be screened out by such units; and suitable moving parts for supplying a cleaning fluid to remove from said cells or units the dust and dirt with which they become charged with use.

On horizontal filter installations, where the cells or units are placed in layers, one above the other, a practical way of cleaning the cells is to spray them with oil without removing them. The oil thus utilized is drained off and returned to the supply tank, and the cleaning does not require a suspension of operation of the device.

My invention belongs to this class, and in its preferred form embraces a number of movable parts by which, while the filter continues in operation, the cleaning fluid such as oil is delivered to every part of the filter cells or units so as to clean the cells thoroughly.

The aim of the invention is to avoid so far as possible all flexible connections between relatively movable parts, and to eliminate leakage; and at the same time provide for proper lubrication of all moving parts and secure efficient and economical operation without increasing the size of the accessories, such as the pump and motor, by means of which the oil is conducted to the filter units. The construction is such that only one row or horizontal layer of filter units is sprayed or washed by the oil at any one time, thus causing least resistance to the flow of the air and less chance for the oil to be carried out by the air from the filter. The operation is very smooth, the drain pipes required are fewer in number and a relatively small quantity of oil is required for the purpose.

Other objects and advantages of this invention will be clear from the following description taken in connection with the drawings by which a preferred embodiment of the invention is disclosed. But I of course may resort to changes not illustrated herein; especially in matters of shape, size and arrangement of the parts to the full extent indicated by the broad and general meanings of the terms in which the appended claims are expressed.

On the drawings—

Figure 2 is a view seen from the left of Figure 1;

Figure 3 is a top plan of a detail included in Figure 1;

Figure 3a is a side view of part of said detail.

Figure 4 is a section on line 4—4 of Figure 2, enlarged;

Figure 1:
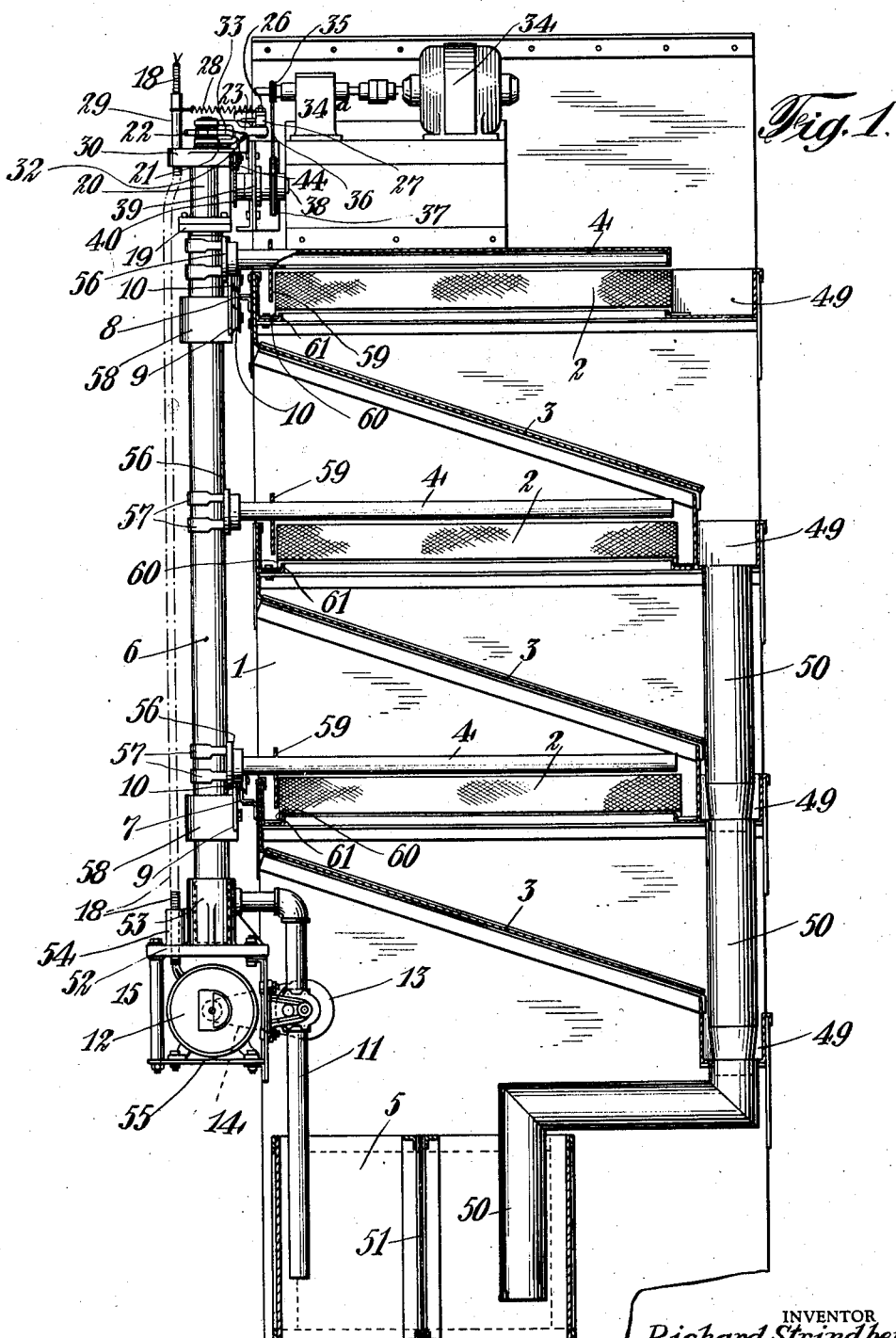
Figure 1 is a side view, partly in section, of a filter built according to my invention.

Figures 5, 6 and 7 are, respectively, sections taken on the lines 5—5, 6—6, and 7—7 of Figure 4, Figure 8 shows a driving connection, and Figure 9 is a section on line 9—9 of Figure 8.

The same numerals identify the same parts throughout.

The filter of my invention is of the same general type as that shown in the application of Alfred M. Goodloe, Serial No. 200,555, filed June 22, 1927, for patent on Apparatus for cleaning and charging air filters.

In the particular description of the drawings, I use the number 1 to indicate a support or framework, and 2 the filter cells or units mounted on same. These cells or units need not be described in detail except to say that they comprise an open-mesh top and bottom, with suitable filtering medium between the top and bottom, through which the air passes; and they are arranged at different levels, one layer of such cells or units being above the other. The framework is of course shown as open from end to end, and below each layer of cells is an inclined deflector plate or apron 3 so arranged that air passes through the framework from one end to the other; say from right to left with reference to Figure 1. It is directed through the different layers of cells from bottom to top, and passes out of the framework at the end opposite to that where it enters. For each layer of cells there is an oil flooding pipe 4 extending across the top of the cells from one end of the framework to the other, and movable sideways, so that the oil can be discharged over all portions of each layer of cells or units 2 and completely clean the same. The oil is drawn from a tank 5 and conducted to the discharge pipes 4 through a vertical header pipe 6 mounted on the framework at the side thereof at which the filtered air is delivered.

In order to discharge oil from the different pipes 4 over all the layers of cells 2 to act upon all parts of same, the header 6 and pipes 4 must be movably mounted so that they can be carried from one side of the framework to the other. For this purpose, I have affixed to the framework at the delivery end thereof, a lower rail 7 consisting of two angle pieces and providing a single flange, and the upper rail 8 consisting of the angle piece and a T-bar to provide two flanges. Affixed to the header pipe 6 are cross-arms 9, which carry grooved rollers 10 engaging the upper and lower rails, and the rollers which are mounted upon the top cross-arm engage both the upper and lower edges of rail 8 so that the header 6 and its supply pipes 4 can not be lifted or lowered with respect to the framework 1. The header 6 is in communication with the tank 5 at the bottom of the framework through a rigid pipe or connection 11; and mounted adjacent to the lower end of the header 6 and movable therewith is an electric motor 12 which operates a pump 13 in the line of the pipe 11 by means of a belt 14. Of course the pump pulley is of larger diameter than the motor pulley to reduce the speed of the pump. The framework supporting the motor 12 is shown at 15 attached to the lower end of the header 6. Within this header is a valve rod 16, upon which there are as many piston valves 17 as there are pipes 4. The pipes 4 communicate with the interior of the header 6 through openings and the piston valves 17 control such communication. The wires for conducting electric current to the motor 12 are shown at 18.

The top of the header 6 is closed by a gland 19, through which the valve rod 16 passes and may turn, and on the top of this gland is secured as by bolts a bearing 20 for the rod 16. The adjacent ends of the gland 19 and bearing may have flanges to be engaged by said bolts. The top of this bearing carries a horizontal extension 21; and above the top of this bearing and affixed to the outer end of the rod 16, is a ratchet wheel 22. This ratchet wheel lies between the forked ends of an arm 23, which is loosely mounted on the rod 16 and can turn with respect to same, and this arm carries a pawl 24 in a cavity between its forked ends. A spring 25 in this cavity causes the pawl 24 to engage the ratchet 22. At its other end the arm has a pin 26, on which is a roller 27, and a spring 28 connects this pin to a piece of tubing 29 affixed to one side of the extension 21 in a projection 30. This projection 30 is eccentric with respect to the ratchet 22 and pivot of the arm 23, and hence when the arm 23 is not in line with the axis of the rod 16 and tube 29, the arm will be thrown over to the right or left. Through the tube 29 passes the cable containing the wires 18 by which current is conducted to the motor 12.

The extension 21 at the top of the bearing 20 has a pair of arms 31 with upturned perforated portions 31a in which are mounted bolts and nuts to serve as stops 32 to limit the movement of the arm 23 from side to side. One of these arms 31 carries a spring 33 affixed to the stop 32 to engage the ratchet 22 and prevent movement of the ratchet backward, that is to say, the ratchet can only move in a clockwise direction with reference to Figure 3.

Mounted at the top of the framework 1 is another electric motor 34 connected through speed-reducing means 34a to a gear 35. This gear turns a chain 36 which operates a sprocket 37. This sprocket 37 is mounted on a shaft 38 in a bracket 39 affixed to the frame 1 adjacent the motor 34, and on the same shaft 38 is a gear 40. A similar bracket 39 and gear or sprocket wheel 40 is mounted at the opposite side of the framework 1, and over the two sprocket gears 40 passes a chain 41 for moving the header 6 and pipes 4 from side to side.

The bearing 20 has a groove or slot 42 therein, with under-cut sides 43 (Figure 9); and the sprocket chain passing over the gears 40 has a special link 44 which carries a roller 45, pivoted on a journal 46. This roller engages with the slot 42 and is overlapped by the sides 43. The roller can move up and down in this slot.

Mounted on the support 1, just above bracket 39, is an adjustable stop 47, and a similar stop 47 will be secured to the support 1 at the right hand end of the range of movement of header 6. These stops may have threaded ends, engaging threaded holes in projections 48 on the framework, and nuts to hold them in adjusted position.

The header 6 has ports 6a, 6b and 6c, leading to pipes 4; taking these pipes in order from top to bottom and the piston valves, each have two ports 17a, 17b and 17c, respectively, to register with ports 6a, 6b and 6c, respectively. The ports 17a are 180 degrees apart and so are the ports 17b and 17c.

In operation then when the motor 34 is running the sprocket chain 41 will be put in motion through the gear 35, chain 36, sprocket 37 and gears 40. With the roller engaging the upper part of the slot 42, the bearing 20, header 6, pipes 4, etc., will be carried say from left to right with reference to Figure 2. At this time suppose the arm 23 is over against the right hand stop 32.

Simultaneously an outlet port 17a in the top piston valve 17, for instance, is communicating with the outlet port 6a in the header 6 in front of the top pipe 4. In other words, the top tier or layer of cells is being sprayed with oil at this time.

When the header reaches the right hand side of the filter the arm 23 hits the stop 47 located on that side of the filter, and the arm 23 is slowly pushed to the left and snaps quickly against the stop screw 32 at the left as soon as the center of roller 27 passes over the center line of the bearing 20.

When this movement takes place the pawl 24 slides over the circumference of the ratchet wheel 22 while the stop 33 is engaging one of the teeth on the ratchet wheel, thus preventing it from turning with the arm. Hence, the top pipe 4 continues in communication with the header 6, and the upper tier of cells receives oil on the return movement of the header and pipes to the left.

When the header again reaches the left hand side of the filter the same operation will take place but the pawl 24 will engage one of the teeth on the ratchet wheel 22 and turn it one-sixth, together with the central shaft 16 and attached piston valves 17. In other words, the outlet port 17a in the top piston will be closed while the outlet port 17b in the next piston below the top will register with the adjacent port 6b and pipe 4.

Thus, on each movement of the header 6 and pipes to the right and return, each tier of cells will be flooded beginning with the top. At the completion of each movement to the left, the valves 17 will be given one-sixth of a turn. By the time the lower tier is flooded, the upper tier is ready to be flooded again, because the second port 17a is then ready to register with the upper pipe 4. For more or less than three tiers of cells, the parts will be designed accordingly to work in the same way.

The oil will thus clean all the filter cells and drain down in the troughs shown at 49 at the lower ends of the deflectors 3 and be returned through pipes 50 into the tank 5.

In the tank 5 is a straw filter 51 and this tank receives the lowermost return pipe 50 from the troughs 49. The filter is between the lower pipe 50 and pipe 11, so that the returned oil is cleaned before it is again drawn up by the pump 13.

The motor 12 is conveniently mounted at the bottom of the header 6 by means of a closure plate 52 which has a bearing 53 into which the header 6 is received. This plate also has a bearing 54 through which the cable containing the wires 18 passes. Below this plate is a rest 55 having the motor attached thereto by bolts or any other suitable way, and bolts or rods fasten this rest to the plate 52. Each of the pipes 4 is secured to the header 6 by means of saddles 56 engaging one end of the pipe and abutting the header 6. Around the header are clamps 57 having threaded ends through the saddles 56 to receive nuts so as to hold these saddles tightly in position. Pipes 4 may be engaged with the saddles in any suitable way, and the joint between the header and the pipes will of course be packed to prevent leakage.

The cross-arms 9 may be fixed to the header 6 by means of bearings or clamps 58, or in any other suitable manner.

An important feature of the invention resides in the shields 59 that are carried by the pipes 4. One of these shields is mounted upon each pipe between the header 6 and the adjacent tier of cells 2. The shield may project slightly above the pipe and below the same to a greater extent down over the adjacent side of the cells and this shield may be round or of some other form and its area may be selected as required. The cells of each tier have downward extending rims 60 on their bottoms, and these rims may engage shelves 61 in the framework 1. The width of the shelf 61 will be broad enough adjacent the discharge end of the filter so that there will be sufficient space to permit the shields 59 to move freely along the adjacent edges of each layer of cells 2 as the pipes 4 travel back and forth to flood the cells 2.

The presence of the shields 59 prevent oil discharged by the pipes over the cells from being blown by the air passing through the cells out of the filter as the air is delivered by the filter. If these shields 59 were not provided, some of the oil used to flood the cells 2 when the filter is in operation might be blown out of the filter and be carried by the air beyond the header 6, with the result that drops of oil would be deposited on the floor adjacent the apparatus and other damage also might occur.

These shields 59 are especially useful when, after a tier of cells 2 has been flooded with oil, the oil supply is shut off. Then the oil retained in the pipe 4 requires some time to run out. The last few drops have, according to tests, a tendency to follow the lower side of pipe 4 and move toward the spray header, where they will drip down on other parts of the header or on the floor. This tendency will of course be increased after the filter is put into operation with the full air flow on. The shields 59 prevent the oil from flowing back along the pipes 4 any farther than the rear edges of the cells 2.

The cells 2 have their downwardly extending rims 60 resting on felt strips 62 on all four sides. These strips 62 lie upon the shelves 61. In combination with the bent up edges 63 of the shelves an efficient air seal is thus provided.

After the flooding operation the frame work all around the cells will to a certain extent be covered with oil, and unless the strips 62 are provided, any air that could pass under the rims 60 would cause a bubbling action in the oil, and would carry small drops of oil with it.

Claims:

1. A filter, comprising filter cells or units, means for distributing fluid over said units, means for moving the distributing means, a reservoir for said cleaning fluid, and a connection projecting into said reservoir and substantially rigid with respect to said distributing means.

2. An air filter, comprising one or more filter cells or units, a pipe to distribute a cleaning fluid over filter units lying in the same plane, a header to which said pipe is connected, said header and pipe being movable, a pump movable with said header, a reservoir, and a connection movable with said pump but rigid therewith and projecting into said reservoir to enable the cleaning fluid to be conducted to the header and pipe when the header and pipe are in motion.

3. A filter, comprising one or more filter cells or units, a pipe to distribute a cleaning fluid over filter units lying in the same plane, a header connected to said pipe, said pipe and header being movable, a storage reservoir for said fluid, a connection from said header to said reservoir and rigid with the header, a pump in the line of said connection and a motor supported by said header to operate the pump.

4. A filter, comprising one or more cells or units, a pipe for distributing a cleaning liquid over filter units lying in the same plane, a header to which said pipe is connected, a piston valve in said header to control communication between the header and pipe, a rod on which said valve is mounted, said header and pipe being movable from side to side of said filter, and means for actuating the rod to put the header periodically into communication with said pipe.

5. A filter, comprising cells or units arranged in tiers, a pipe for distributing a cleaning fluid over each tier, a header to which said pipes are connected, said header and said pipes being movable from side to side of the filter, piston valves in said header to control communication between the pipes and the header, said valves having ports to enable the header to deliver to each of said pipes separately, a rod in the header on which the valves are fixed, and means for actuating the rod to turn the valves to connect the pipes successively to said header.

6. A filter, comprising one or more filter cells or units, a movable header having a delivery pipe to distribute a cleaning fluid over cells lying in the same plane, a valve in said header to control communication between same and said pipe, a rod for said valve, a ratchet wheel affixed to said rod and an arm carrying a pawl to operate the wheel and turn said rod and valve.

7. A filter, comprising one or more filter cells or units, a pipe to distribute a cleaning fluid over the units lying in the same plane, a header for the pipe, a valve in the header to control the pipe, a rod in the header to turn the valve, a ratchet wheel on said rod, an arm carrying a pawl to engage the ratchet and turn the rod, said header and said pipe being movable, and means at each end of the movement of said header and pipe to actuate said arm.

8. A filter, comprising one or more cells or units, a supply pipe to deliver cleaning fluid to units lying in the same plane, a header to which the pipe is affixed, said header and pipe being movable from side to side of the filter, a sprocket chain for imparting movement to said header and pipe, a grooved bearing block having a slot secured to said header and a connection between the chain and the block for enabling the chain to carry the header and pipe from one side of the filter to the other.

9. An apparatus according to claim 8 wherein the connection between the chain and the block is in the form of a roller attached to one link for entering said slot.

10. A filter, comprising one or more filter cells or units, a pipe to distribute a cleaning fluid over filter units lying in the same plane, a movable header to which said pipe is attached, a valve in the header to control communication between same and the pipe, a rod for operating the valve, said rod projecting from the header, an extension at one end of the header, a ratchet on the projecting end of the rod, an arm mounted on the rod carrying a pawl to engage the ratchet, stops on the extension at each side of said arm to limit the movement thereof, a spring for holding the arm against one of said stops or the other, and means on the filter for actuating the arm at either end of the movement of the header and pipe to cause the pawl to engage the ratchet and turn said rod when said arm is moved in one direction.

11. An apparatus according to claim 10 wherein one of said stops carries a spring detent to prevent movement of the ratchet except when the arm moves in the right direction to cause the pawl to turn the ratchet and rod.

12. A filter comprising one or more cells or units, a pipe to distribute a cleaning fluid over filter units lying in the same plane, a movable header carrying said pipe, a plate having a bearing to receive one end of said header, a storage reservoir for said fluid, a pipe rigid with the header and projecting into said reservoir, a pump in the line of said pipe and a motor attached to said plate to operate the pump, said pump and said pipe being movable with the header.

13. A filter comprising one or more cells or units, a pipe to distribute a cleaning fluid over filter units lying in the same plane, a movable header carrying said pipe, a bearing affixed to one end of the header and having a slot, a carrier chain having a link bearing a roller to enter the slot to move the header, a piston valve in the header to control the pipe, a rod carrying the valve, a ratchet on said rod, an arm having a pawl to engage said ratchet, the bearing having stops at each side of said arm, and a spring attached to the outer end of said arm and a fixed point to throw the arm, as soon as the arm is moved out of line with the rod and said point, against one or the other of said stops.

14. Means for cleaning the filtering medium of an air filter while arranged in air filtering position, said means including a cleaning fluid distributing member positioned with its discharge outlet contiguous to one side of the filtering medium, a pump, conduit means connecting said distributing member with the pump outlet, means for moving the pump, the conduit means and the delivery member as a unit with respect to the filter to distribute the fluid discharged by said member over the filter medium, and means for continuously supplying the pump with cleaning fluid during movement thereof.

15. Means for cleaning the filtering medium of an air filter while arranged in air filtering position, said means including a cleaning fluid distributing member positioned with its discharge outlet contiguous to one side of the filtering medium, a pump, conduit means connecting said distributing member with the pump outlet, means for moving the pump, the conduit means and the delivery member as a unit with respect to the filter to distribute the fluid discharged by said member over the filter medium, valve means controlling the flow of fluid from the conduit to the delivery member, means for automatically actuating said valve means at the end of the travel of the fluid distributing means in each direction, and means for supplying cleaning fluid to the pump during movement thereof.

16. In a filter device, a filter for the air, means for directing air upwardly through said filter, means located above said filter for delivering cleaning fluid thereto, an elongated tank for the cleaning fluid, a carriage movable lengthwise of said tank, a pump mounted on said carriage, an inlet pipe connection for said pump dipping into said tank and movable therealong, and connections between said means and said pump, said means being movable above said filter.

17. In a filter device, a filter, means for passing air therethrough, a movable carriage, a pump mounted on said carriage, means for delivering a cleaning fluid from the pump to the filter, a motor, and means operable by said motor for actuating said carriage.

In testimony that I claim the foregoing as my invention, I have signed my name hereto.

RICHARD STRINDBERG.